Sept. 12, 1944. C. E. SUNDERLAND 2,358,037
MILKING APPARATUS
Filed March 18, 1941 3 Sheets-Sheet 2
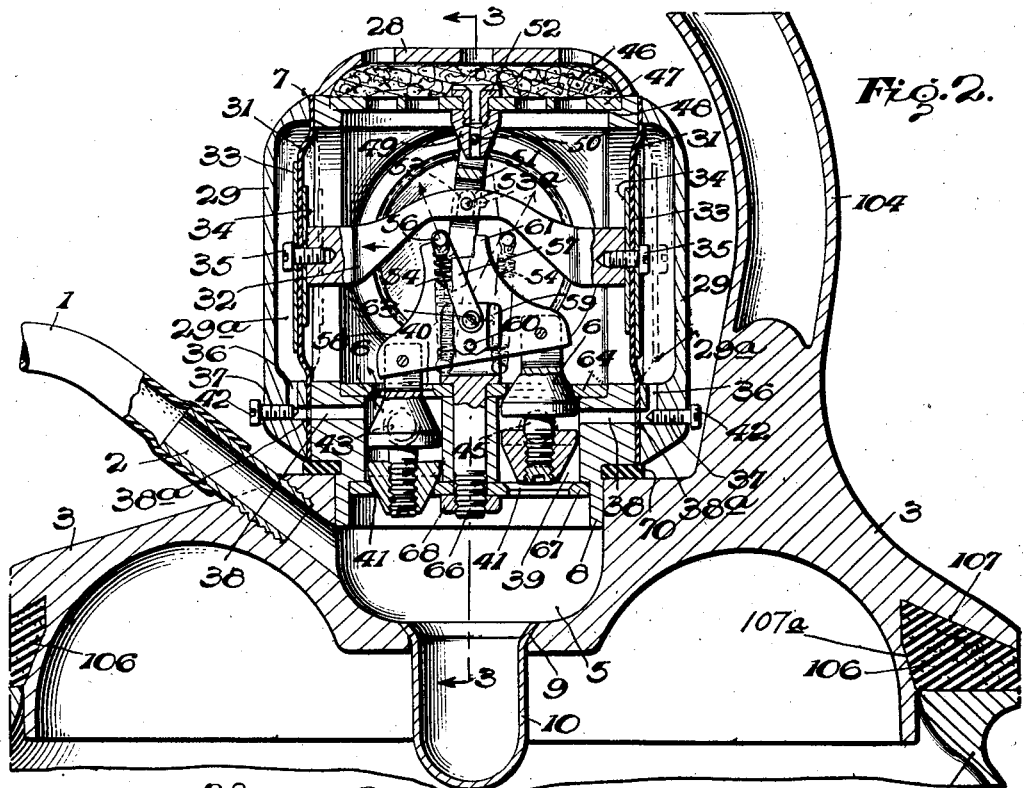
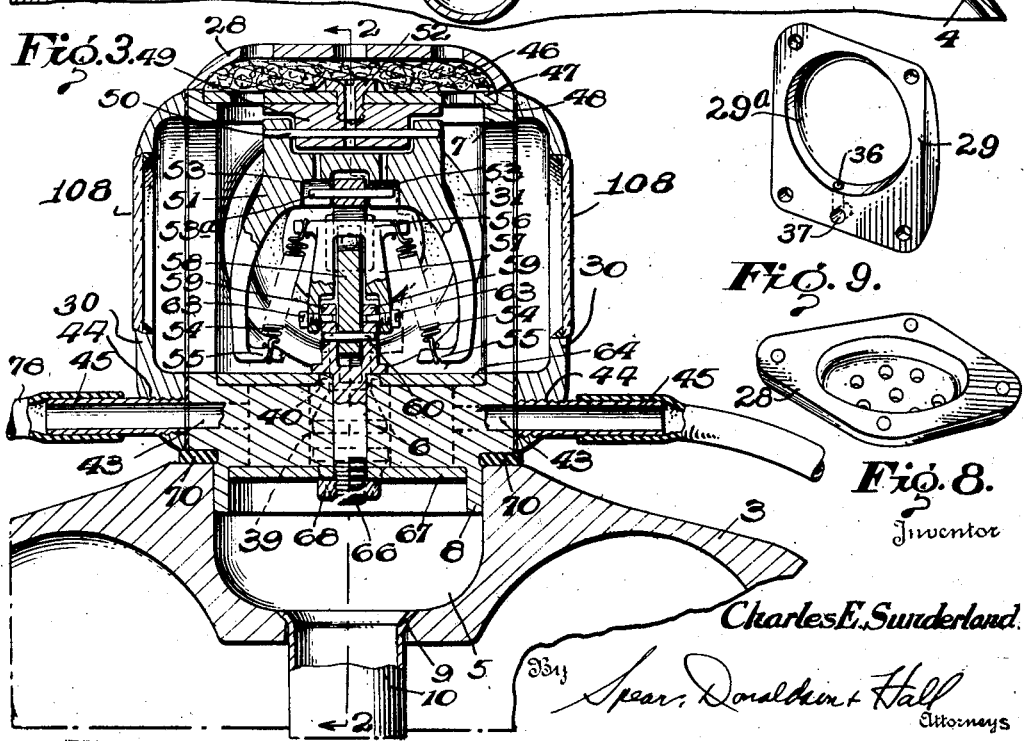
Inventor
Charles E. Sunderland Sept. 12, 1944. C. E. SUNDERLAND 2,358,037
MILKING APPARATUS
Filed March 18, 1941 3 Sheets-Sheet 3
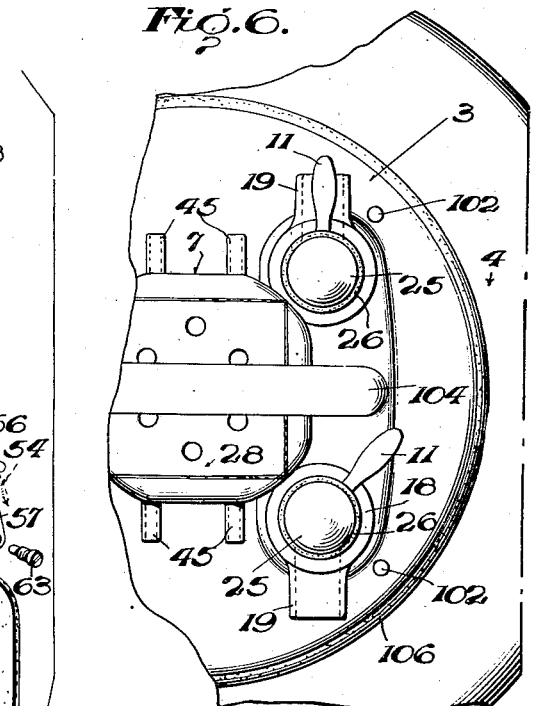
Fig. 6.
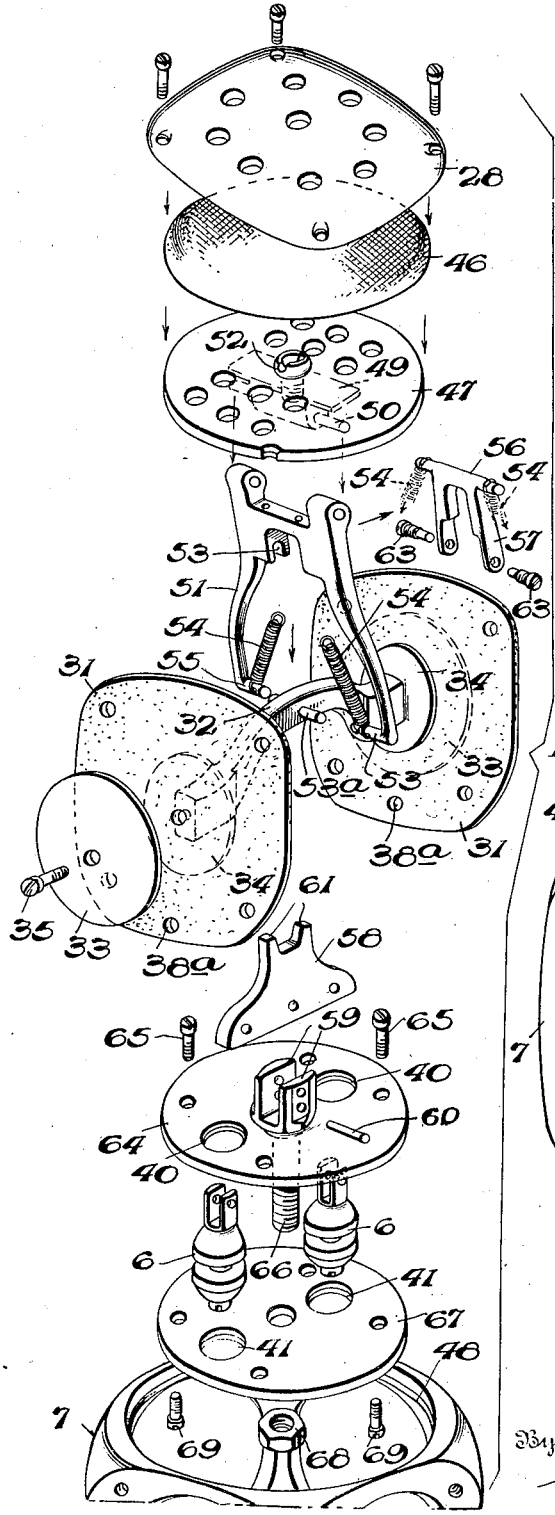
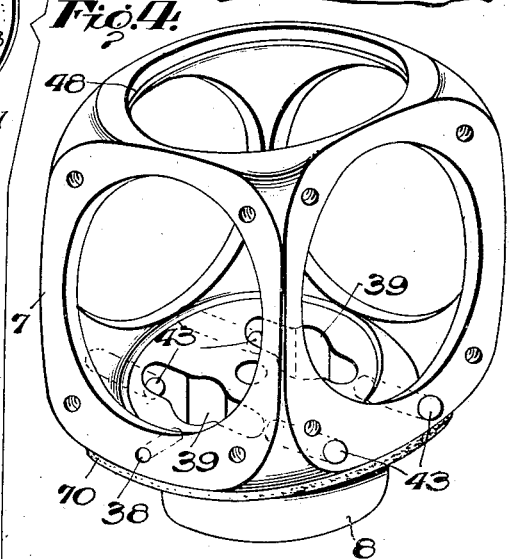
Fig. 4.
Fig. 5.
Inventor
Charles E. Sunderland.
Spear, Donaldson & Hall
Attorneys Patented Sept. 12, 1944

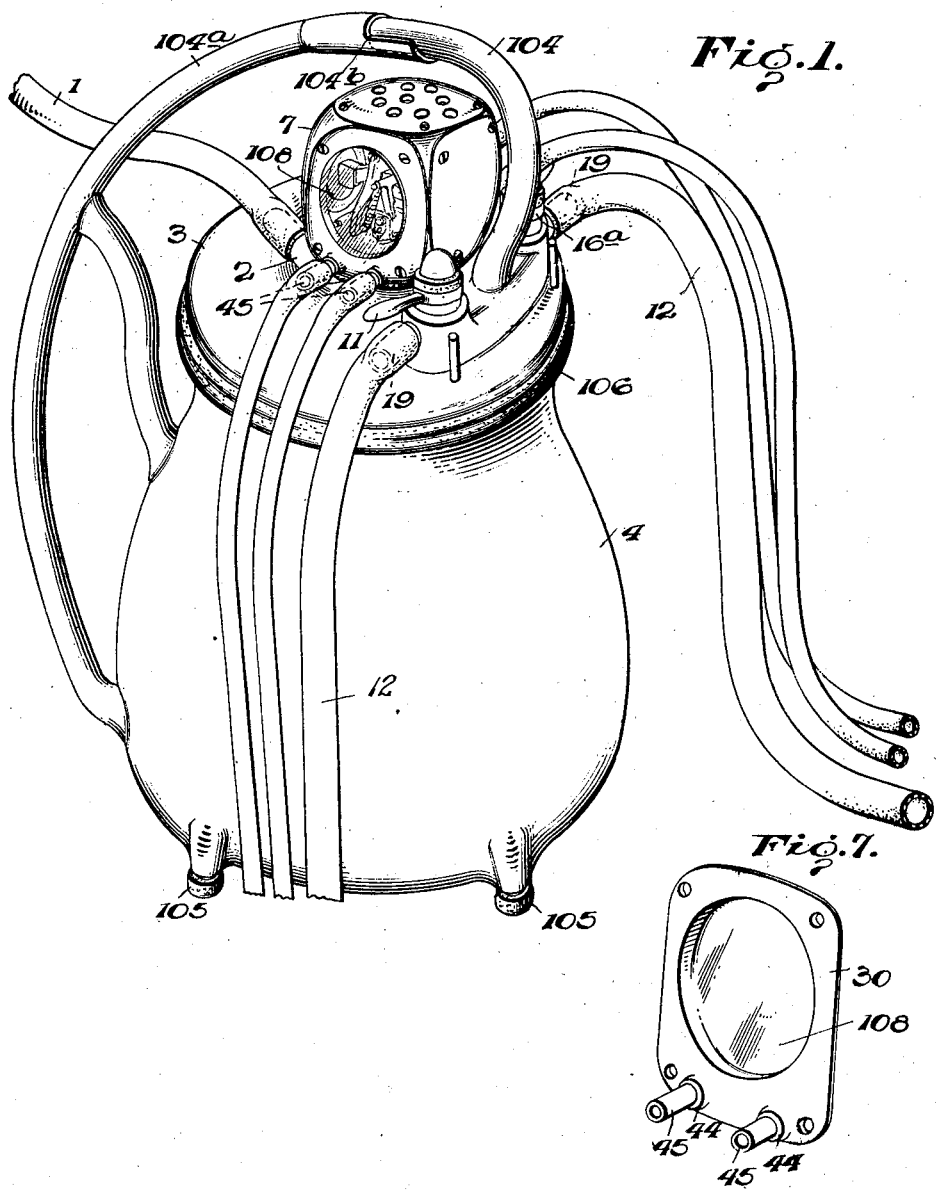

2,358,037

UNITED STATES PATENT OFFICE 2,358,037

MILKING APPARATUS

Charles E. Sunderland, Hardwick, Vt., assignor to Sam Daniels Mfg. Co., Inc., Hardwick, Vt., a corporation of Vermont Application March 18, 1941, Serial No. 384,015

19 Claims. (Cl. 31—62)

The invention relates to milking apparatus and has for an object the provision of a milker of improved construction and efficiency.

Another object is the provision of a pulsator mechanism embodying improvements in construction, positive action, sensitivity and reliability.

Other objects of the invention will appear hereinafter.

The invention comprises the features, combination and arrangement of parts as hereinafter described and claimed.

Figure 1 is a view of the assembled milking apparatus embodying the invention.

Fig. 2 is a sectional elevation through the pulsator and the pail top substantially on the line 2—2 of Fig. 3.

Fig. 3 is a sectional elevation of the same substantially at right angles to Fig. 2 on the line 3—3 of Fig. 2.

Fig. 4 is a view of parts of the pulsator in separated condition.

Fig. 5 is a perspective view of the cage or housing of the pulsator.

Fig. 6 is a fragmentary top plan view of the milk can top.

Fig. 7 is a detail of a portion of the pulsator structure as also are Figs. 8 and 9.

Referring to the drawings, 1 represents a hose connection from a suitable source of suction or vacuum for operating the milker of my invention, the hose 1 being connected to pipe or stem 2 which I preferably mount in the top 3 of the milk pail or can 4 and which pipe 2 communicates with suction chamber 5 in the cover or top 3, as seen in Fig. 2.

The suction chamber 5 communicates with the two valves 6 of the pulsator or actuator unit 7, the depending flange 8 of which is removably received in frictional engagement with the walls of the suction chamber 5.

At its bottom, the chamber 5 communicates with an opening 9 in the cover or top 3 which is closed by a suction responsive valve member 10 in the form of a cup which has an outwardly flaring upper rim preferably designed to conform to the surface of the adjoining structure of the cover to make a smooth contour at the seated valve substantially free from protuberances.

The chamber 5 and the cup-shaped valve 10 are preferably so constructed and shaped as to provide for catching in the cup-shaped valve 10 any dirt, refuse, or foreign matter which may be present in the conduit 1 and which may pass therefrom into the chamber 5, and to thereby exclude such foreign matter from the milk in the pail 4. When conduit 1 is removed from the supply source or line (not shown) the suction is cut off and air would pass into the tube 1 and stem 2 and chamber 5 and thus foreign matter may be carried into the chamber 5. The cup-shaped valve 10 will therefore collect any such foreign matter therein and retain it until such time as it may be emptied at the end of the milking operation.

The suction lifts this valve 10 and applies the suction or vacuum to the interior of the milk can. A valve 11 is provided and mounted in the top or cover 3 which serves to control communication of the suction or vacuum in the milk pail with the main hose 12 leading to a mechanism for milking a cow and drawing the milk into the pail or can. The valve 11 may be duplicated as indicated at 16a in Fig. 1 to provide for milking two cows at the same time.

The pulsator or actuator of my invention in some respects may be said to operate along established lines while embodying marked improvements in construction, sensitivity or responsiveness and reliability. Two valves, each having upper and lower seats, are employed as well as two diaphragms, atmospheric pressure being applied to one diaphragm while suction or vacuum is applied to the other, and one valve being on its upper seat while the other is on its lower seat, to provide the said application of atmosphere and suction. Means operate upon movement of the diaphragms induced by the suction to shift the valves to reverse the process. Lead-offs from the valve chambers between the valve seats will thus alternately be provided with suction or vacuum and with atmospheric pressure, which pulsating or alternating vacuum and atmospheric pressure is conveyed through the teat claw or manifold of the milker to the teat cup and inflation member which engages the teat of the cow or other animal.

The pulsator or actuator of my invention (Figs. 2 to 5) comprises a housing or cage 7 having the flange 8 seated in the cover 3, and with a removable top 28 and four removable sides 29, 29 and 30, 30, all of which may desirably be secured to the cage 7 by screws or the like as shown. The opposite removable sides 29, 29 are substantially the same in construction and provide recesses 29a, 29a forming diaphragm chambers by which variations in pressure or suction may be applied to the diaphragms 31, 31 connected by rigid connecting rod 32. The diaphragms 31 and their plates 33, 34 may desirably be secured to the connecting rod 32 by screws or the like 35. The diaphragms may also desirably be clamped between the removable sides 29 and the housing or cage 7 and the diaphragms may preferably be provided with holes for passage of the fastening screws, as indicated in the drawings.

Port 36 extends downwardly through the wall of each of the side members 29 and communicates with a horizontal passage 37 therein which registers with a similar passage 38 in the cage and 38a in the diaphragm which are in communication with the valve chamber 39 provided between the upper and lower valve seats 40, 41 of each of the two valves 6. Needle valve screws 42 for controlling these passages are mounted in the holes or passages 37, adjustable from the exterior of the pulsator.

When one of the valves 6 is raised from its lower seat and against its upper seat, the vacuum or suction present in the suction chamber 5 has access through a valve chamber 39, passage 38, and ports 36, to the diaphragm chamber 29a (while the other valve 6 is upon its lower seat to admit atmospheric pressure to its diaphragm), to operate the diaphragms 31 to move the same and the connecting rod 32 toward the suction side. At the same time since each of the valve chambers 39 is in communication with at least one port 43 in the cage leading through a similar port 44 in the side piece 30 to a nipple 45, the suction or vacuum is so applied for transmission from the pulsator to the teat cup assembly, and the atmospheric pressure is similarly applied from the other valve chamber 39 through corresponding ports to another nipple 45 extending from the same side of the pulsator, as the nipple 45 first mentioned.

Thus atmospheric pressure is exerted in one lead-off nipple 45 while the other nipple 45 on the same side of the pulsator has suction or vacuum therein. When the valves 6 are reversed on their seats by completion of the movement of the diaphragms in one direction, the action is reversed to move the diaphragm in the opposite direction and the suction is applied in the nipple 45, which in the previous position of the valves had atmospheric pressure therein, while the previously vacuumized nipple 45 is then subject to atmosphere.

The lead off structure from the valve chambers 39 of the pulsator, comprising ports 43, ports 44, and nipples 45 may desirably be duplicated on the opposite side of the pulsator to provide alternate suction and atmosphere to a second test cup assembly for milking of two cows at the same time if desired. When it is desired to apply the device to only one cow, the nipples 45 on the side of the pulsator not being used, may be stopped in any suitable manner.

The top of the pulsator provides means for admitting atmospheric pressure to the interior of the pulsator and thence past the upper valve seat of the valve which is down at the time to the valve chamber 39 as described. As shown, I provide the top member or cap 28 perforated as shown and secured by screws or the like to the pulsator cage or housing. The top 28 has a recess in its under face receiving a filter member 46 of suitable material such as cloth. A removable perforated disc 47 underlies the air filter 46 and rests upon a shouldered part 48 of the housing 7 of the pulsator, and is removable by lifting it upwardly.

Secured to this plate or disc 47 at its under side is a member 49 carrying pin means 50 to serve as pivotal suspension for a forked member 51. The member 49 may desirably be secured to the plate 47 by means of a screw 52 extending through a central opening in the plate 47. The screw may have a central oil passage communicating with suitable oil passages in the member 49 and forked member 51 and leading to recesses 53 in said forked member 51, which recesses receive projections or pins 53a of the diaphragm connecting rod 32 for moving said pivoted fork 51 in the direction of movement of said diaphragm connecting rod.

The fork 51 has springs 54 secured to each of its ends 55, the springs extending upwardly and connecting to the ends of an upper cross part of a kicker or trip member 56 having depending arms 57 straddling the rocker bar 58 which carries the valves 6. The arms 57 are pivotally mounted at their lower ends on spaced posts 59 extending upwardly from the bottom of the pulsator housing, and the upper cross part of the kicker member 56 is adapted to swing from one side to the other and in so doing to engage the valve rocker bar 58 which is pivotally mounted centrally thereof in said posts 59 as at 60, to engage and rock the bar 58 according to the direction of the movement of the kicker member to change the position of the valves. The upper part of the rocker bar may be notched, if desired, to receive the member 56, thus providing studs 61 on the rocker bar to be engaged by said kicker member.

The pivot of the rocker bar 58 may be provided by a pin 60 extending through posts 59 and through the rocker bar 58. The pivots of the kicker member 56 may be provided by pins 63 threaded into each of the arms 57 and having bearing portions extending into the posts 59, which may be at a point above the pivot 60 of the rocker arm as shown, although the invention is not to be limited to such eccentric relation of the pivots, which may be at the same point, i. e. concentric, or in any other suitable relation.

The construction as above described provides a very responsive pulsator which functions positively at all times without any possibility of stopping on dead center upon cessation of suction, as has been an objection to prior devices, which would prevent the proper functioning of the device upon re-starting the suction, since both valves would be free to assume an intermediate position and the suction could not take hold.

By my improved construction the valves are held under positive control at all times so that both are quickly and positively seated (one up and one down) both when operating the pulsator or actuator and when idle. If the valves are not properly seated and held seated at all times until quickly and positively kicked or shifted to their other position, the machine will not start because the necessary amount of suction cannot be applied to the diaphragm due to the valves being likely to be open in respect to both of their seats.

It is impossible in my improved actuator or pulsator for the device to remain on such dead center position, since the springs 54 which connect the lower ends of the pivotally suspended fork member 51 of my device with the upper part of the kicker or trip member 56, by reason of the swinging movement of member 51, can exert their force prior to the crossing of the dead center position by the kicker member to snap or pull the member 56 quickly and positively to the other position, thus snapping the valve rocker arm over.

It will be apparent that the functioning of my device involves swinging movement of the fork member 51 impelled by the projecting pin means 53a on the diaphragm connecting bar. The swinging movement of the fork member moves the lower ends of the springs in the direction of movement of the diaphragm bar. This movement of the lower ends of the springs moves them from their position, in which they hold the kicker member 56 tilted against the rocker bar with one valve up and the other down, to a position beyond the plane or line of said tilted kicker member 56, whereupon the springs exert their pulling force on the upper part of the kicker or trip member 56 to cause it to swing to the reverse position reversing the rocker 58 and the valves 6. Until the moment that the springs pass the plane of the tilted kicker member they exert their force to hold the kicker in the position first mentioned. Each valve is thus positively held by the springs in either fully open or fully closed position at all times until quickly snapped to the other position as described.

By reason of my construction, springs 54 may be of relatively light weight, and need not be of heavy weight in order to get the proper positive snap action. The mounting of the springs between the outer ends of the oppositely disposed pivoted swingable members 51 and 56, contributes to the positive snap action and sensitivity of my pulsator, as also does the eccentric relation of the pivotal mountings of the member 56 and the rocker 58.

The bottom of the cage or housing 7, has the valve chambers 39 formed therein of elongated shape as shown and extending through the said bottom. A central opening also extends through said bottom. A plate 64 is seated downwardly in a shouldered recess provided therefor in the upper face of said cage bottom and desirably may be secured in place by fastening screws or the like 65, with the openings 40 in the plate providing upper valve seats for the valves 6 and said openings 40 registering with the central part of the valve chambers 39. The studs or posts 59 may desirably be formed as a part of the head of a bolt member 66 extending downwardly through a central opening in the plate 64 and the central opening in the cage bottom, and through a central opening in another plate 67 inserted upwardly into a recess provided in the underside of the cage bottom within the depending flange 8 of the cage or housing, and held in place by a nut 68 secured to the end of bolt 66. The plate 67 has openings 41 therein providing lower valve seats in registry with the central part of valve chambers 39 and with the upper valve seat openings 40, said plate 67 being preferably further held in place by screws or the like 69. The pulsator desirably seats upon a washer 70 between it and the can top 3. The valves 6 are preferably of adjustable construction, with upper and lower parts in threaded relation, and with a stop or lock nut threaded into the lower part for engagement with the end of the screw shaft of the upper part. The valves have a pivotal connection with the rocker 58 by means of cotter or other pins.

The pulsator starts functioning when the suction is applied to the conduit 1 from the supply line or source (not shown). When the supply of suction is cut off by suitable hand operated valve means on the supply line (not shown) the pulsator will stop functioning. Suction or vacuum, however, is retained in pail 4 by the cup valve 10, until such time as the valve 11 is opened, which valve 11 had already been shut to take off the teat cups from the cow. The vacuum which thus remains in the pail 4 enables the operator of the milking machine to carry the machine and pail by any part or parts of handle 104, connection 104b or part 104a. In order to remove the milk from the pail 4, the operator upon arriving at the strainer to empty the milk, turns valve 11 to the on position, thus immediately releasing the vacuum, which enables the operator to remove the cover 3 by handle 104.

The handle comprises a portion 104 fixed to or integral with the top 3 and separable by an upward movement, from the handle portion 104a which is fixed to or integral with the can 4 as shown. The handle portions are separable as shown by the socket portion 104b on the handle part 104a, which socket is partially open along its upper side to removably receive the handle part 104.

The top 3 of the can has a sealing rubber washer or ring 106 mounted in a groove 107 in the top which I have designed to ensure a tight fit of the top with the can 4 and also designed to apply the cover 3 to the standard milk can if desired. This washer or sealing ring, desirably of rubber, by reason of its shape according to my design and by reason of the inwardly and upwardly tapered shape of the groove 107 is forced by the weight of the can top 3 to tend to move or flow inwardly and upwardly toward the inside surfaces of the groove 107.

The inside surface of the groove as seen at 107a is inclined to prevent or counteract any tendency for the sealing ring or washer to slip or fall off, as when the cover 3 is removed and carried separately from the can or pail 4.

The inward motion as described above of this rubber washer 106 causes a definite seal between the inside of the washer and cover 3. No milk is able, therefore, to get in between the washer and the head or cover. Besides this, the inward motion of the rubber 106 caused by the pressure of cover 3 downward on paid 4 eliminates any stretch in the rubber washer 106. Therefore, there is never any reason to renew this washer until at such time as the life of the material is exhausted. The upwardly inclined line or groove 107 effects this result.

The pail 4 is preferably so designed as to make all parts of the interior thereof readily visible for inspection and cleaning, and is preferably provided with four feet 105 near the outer periphery of its base to resist upset and preferably of rubber.

Preferably, I provide means for enabling observation of the operation of the pulsator at all times, as the sound of the operating pulsator or actuator is likely to be indistinguishable over the noise and disturbances in a milk barn while the milking machine is in use. As shown in Figs. 1, 3 and 7, I provide an observation window 108 in one or both of the side members 30 which are secured to the pulsator housing or cage, the window being fitted with glass or other transparent material in an airtight manner, permitting observation of the action or functioning of the pulsator at all times, so that at all times the operator can tell at a glance whether or not the pulsator is operating.

I claim:

1. In a pulsator for milking machine or the like having pressure responsive diaphragms and valves controlling the movement of air to and from the diaphragms, a member mounted for rocking movement in the pulsator and connected at each of its ends to one of the valves of the pulsator, a kicker member pivotally mounted at its lower end and having a free upper end portion to engage and actuate said rocker member, a forked member disposed transversely to said rocker member, and pivotally mounted at the upper part of the pulsator with its arms extending downwardly one on either side of said rocker member, and springs having their lower ends connected one to the free lower end of each of said arms of said forked member and their upper ends connected to the free upper end portion of said kicker member, and means directly connecting said forked member with the diaphragms of the pulsator, and independent of said kicker member, for moving said pivoted forked member directly by movement of the diaphragms of said pulsator, whereby the lower ends of said springs are moved in the direction of movement of the diaphragms, from a position in which they hold the kicker member in stationary holding engagement against the rocker with one valve open and the other valve closed, to a position beyond the plane or line of said kicker member in said stationary holding position, so that the springs exert a pulling force on the upper part of the kicker member and then cause it to swing to the reverse position, reversing the rocker and the valves.

2. In a pulsator for milking machines or the like, a housing, removable top and sides therefor, said housing having a base portion with valve chambers formed therein, and a recess in its upper face, a flange depending from the lower face of said base and providing a recess within the said flange, a plate inserted in said lower recess and providing lower valve seats, and a plate inserted in said upper recess and providing upper valve seats for valves in said chambers, and means for removably holding said valve seat plates in position.

3. A pulsator according to claim 2, in which said means for removably holding said valve seat plates in position comprises a central bore in the base of said housing and a bolt extending through corresponding openings in the upper and lower plates, said bolt having a head providing upstanding stud means receiving pivotal mountings of moving parts of the pulsator, said bolt clamping the plates to the base and having a nut on its lower end.

4. In a pulsator for milking machines or the like, having pressure responsive diaphragms and valves controlling the movement of air to and from the diaphragms, a member mounted for rocking movement and connected at each of its ends to one of the valves of the pulsator, and means for operating said rocker comprising a member pivotally mounted at the upper part of the pulsator and having a depending portion, a kicker member having its lower end pivotally mounted at a lower part of the pulsator and having a free upwardly extending portion for engaging and moving said rocker, spring means connecting the pivoted depending member and kicker member, and means directly connecting said depending member with the diaphragms of the pulsator, said direct connection being independent of said kicker member and capable of moving said depending member upon movement of the diaphragms of the pulsator to move the spring means into position to actuate the kicker member to shift the rocker and valves.

5. In a pulsator according to claim 4, said means for moving said pivoted depending member comprising elements on a connecting bar between the diaphragms of the pulsator, to engage and move the depending member, said depending member comprising a fork straddling said connecting bar and disposed substantially at right angles thereto with portions thereof aligned with said elements of the diaphragm connecting bar.

6. In a pulsator for milking machines or the like, having pressure responsive means and valves controlling the movement of air to and from the pressure responsive means, movable valve controlling means, a member pivotally mounted at one end of its ends in said pulsator and having a free end for actuating said valve controlling means, a spring connected at one of its ends to the said free end of said pivoted member, a second member pivotally mounted at one of its ends in said pulsator and having a free end, said spring being connected at its other end to the free end of said second pivotally mounted member, said spring stressed pivoted actuating member being held by the spring in a stationary position positively engaging and holding the valve controlling means in position with one valve positively held closed and another positively held open, until snapped to another position, and means connecting said second pivoted member with the pressure responsive means of the pulsator whereby movement of the pressure responsive means causes movement of said second pivoted member to move the end of the spring connected thereto into a position past the plane or line of the pivoted actuating member in its stationary holding position to cause the spring to actuate said pivoted actuating member to release and actuate the valve controlling means to another position.

7. In a pulsator for milking machines or the like having pressure responsive means and valves controlling the movement of air to and from the pressure responsive means, movable valve controlling means, a member pivotally mounted in said pulsator for actuating said valve controlling means, a spring connected to said pivoted member and holding said member in a stationary position positively engaging and holding the valve controlling means in position with one valve positively held closed and another positively held open, until snapped to another position, the body of said spring being disposed with its axis offset to one side of the line of said pivoted member in its stationary holding position, and means connected with the pressure responsive means of the pulsator for movement therewith arranged to move the body of the spring about its connection with said pivoted member from said stationary holding position to a possition in which the axis of the spring is offset to the opposite side of the line of said pivoted member, thereby causing the spring to release and move said pivoted member from said stationary holding position to another position by a snap action actuating said movable valve controlling means to another position, said means connected with the pressure responsive means of the pulsator including a second member pivotally mounted in said pulsator and connected to the other end of said spring to move the body of the spring as described upon movement of the pressure responsive means.

8. In a pulsator for milking machines or the like having pressure responsive means and valves controlling the movement of air to and from the pressure responsive means, movable valve controlling means, a member pivotally mounted in said pulsator for actuating said valve controlling means, a spring connected to said pivoted member and holding said member in a stationary position positively engaging and holding the valve controlling means in position with one valve positively held closed and another positively held open, until snapped to another position, the body of said spring being disposed with its axis offset to one side of the line of said pivoted member in its stationary holding position, and means connected with the pressure responsive means of the pulsator for movement therewith arranged to move the body of the spring about its connection with said pivoted member from said stationary holding position to a position in which the axis of the spring is offset to the opposite side of the line of said pivoted member, thereby causing the spring to release and move said pivoted member from said stationary holding position to another position by a snap action actuating said movable valve controlling means to another position, said means connected with the pressure responsive means of the pulsator including a second member pivotally mounted in said pulsator and oppositely disposed in respect to the first mentioned pivoted actuating member, said second pivoted member being connected to the other end of said spring to move the body of the spring as described upon movement of the pressure responsive means.

9. In a pulsator for milking machines or the like having pressure responsive means and valves controlling the movement of air to and from the pressure responsive means, movable valve controlling means, a member pivotally mounted in said pulsator for actuating said valve controlling means, a spring connected to said pivoted member and holding said member in a stationary position positively engaging and holding the valve controlling means in position with one valve positively held closed and another positively held open, until snapped to another position, the body of said spring being disposed with its axis offset to one side of the line of said pivoted member in its stationary holding position, and means connected with the pressure responsive means of the pulsator for movement therewith arranged to move the body of the spring about its connection with said pivoted member from said stationary holding position to a position in which the axis of the spring is offset to the opposite side of the line of said pivoted member, thereby causing the spring to release and move said pivoted member from said stationary holding position to another position by a snap action actuating said movable valve controlling means to another position, said means connected with the pressure responsive means of the pulsator comprising a second member pivotally mounted in said pulsator and connected to the other end of said spring, and a connecting rod between the said second pivoted member and the pressure responsive means of the pulsator to move the second pivoted member and the body of the spring as described, upon movement of said pressure responsive means.

10. In a pulsator for milking machines having pressure responsive means and valves controlling the movement of air to and from the pressure responsive means, a member mounted for rocking movement and connected at each of its ends to one of the valves of the pulsator, a member pivotally mounted in said pulsator and extending upwardly from said pivot and having a free upper end for actuating said rocker by swinging movement, a spring connected at one of its ends to the said free end of said pivoted member, a third member pivotally mounted in an upper part of said pulsator and having a depending portion and a free lower end, said spring being connected at its other end to the free lower end of said pivoted depending member, and means connected to the pressure responsive means to move said pivoted depending member upon movement of said pressure responsive means thereby moving the spring connected to the lower end of said pivoted depending member into position to move the said pivoted actuating member to actuate the rocker and valves.

11. In a pulsator for milking machines according to claim 10, the horizontal pivotal axis of said actuating member and the horizontal pivotal axis of said third member being disposed substantially in vertical alignment in one plane.

12. In a pulsator for milking machines according to claim 10, the horizontal pivotal axis of said actuating member and the horizontal pivotal axis of said rocker and the horizontal pivotal axis of said third member being disposed substantially in vertical alignment in one plane.

13. In a pulsator for milking machines having pressure responsive means and valves controlling the movement of air to and from the pressure responsive means, movable valve controlling means, a member pivotally mounted at one of its ends in said pulsator and having a free end for actuating said valve controlling means, a spring connected at one of its ends to the said free end of said pivoted member, a second member pivotally mounted at one of its ends in said pulsator and having a free end, said spring being connected at its other end to the free end of said second pivotally mounted member, said spring stressed pivoted member being held by the spring in a stationary position positively engaging and holding the valve controlling means in position with one valve closed and another valve open, until snapped to another position, and means connected to the pressure responsive means to move said second pivoted member upon movement of the pressure responsive means thereby moving the spring connected to the free end of said second pivoted member into position to move the said pivoted actuating member to actuate the movable valve controlling means and valves, the horizontal pivotal axis of said actuating member and the horizontal pivotal axis of said second member being disposed substantially in vertical alignment in one plane.

14. In a pulsator for milking machines according to claim 13, said movable valve controlling means comprising a member mounted for rocking movement and connected at each of its ends to one of the valves of the pulsator, the horizontal pivotal axis of said rocker being also disposed substantially in said vertical alignment.

15. In a pulsator for milking machines according to claim 10, said pivoted actuating member being of substantially fork shape and straddling said rocker transversely thereto, said rocker having a recess in its upper portion, the upper transverse portion of said fork shaped actuating member being disposed in said recess in the rocker to engage the rocker at the ends of said recess to actuate the rocker, said pivoted depending member also being of substantially fork shape and straddling said rocker transversely thereto and straddling said pivoted actuating member.

16. In a pulsator for milking machines according to claim 10, said pivoted actuating member being of substanitally fork shape and straddling said rocker transversely thereof, said rocker having a recess in its upper portion, the upper transverse portion of said fork shaped actuating member being disposed in said recess in the rocker to engage the rocker at the ends of said recess to actuate the rocker, said pivoted depending member also being of substantially fork shape and straddling said rocker transversely thereof and straddling said pivoted actuating member, said means connected to said pressure responsive means comprising a member engaging said pivoted depending member and extending in a direction transversely thereof.

17. In a pulsator for milking machines according to claim 10, said pivoted actuating member being of substantially fork shape and straddling said rocker transversely thereto, said rocker having a recess in its upper portion, the upper transverse portion of said fork shaped actuating member being disposed in said recess in the rocker to engage the rocker at the ends of said recess to actuate the rocker, said pivoted depending member also being of substantially fork shape and straddling said rocker transversely thereto and straddling said pivoted actuating member, said means connected to said pressure responsive means comprising a bar extending transversely of said pivoted depending member and straddled by said depending member, said bar having projections thereon engaging said pivoted depending member to impart movement thereto in either direction longitudinally of said bar.

18. In a pulsator for milking machines or the like, a housing, a member secured in the upper part of the housing and extending downwardly therein, a forked member pivotally connected to said fixed member and depending downwardly therefrom for swinging movement about said pivot, diaphragms in said housing at opposite sides thereof, a connecting bar secured at its ends to said opposite diaphragms and extending transversely through the fork of said forked member and being straddled thereby, interengaging means between the connecting bar and said forked member to impart movement of said bar to said pivoted forked member in either direction longitudinally of said bar, said housing and said member fixed in the upper part thereof having a substantially vertical oil passage therethrough, said pivotal connection communicating with said vertical oil passage, valves and valve seats, and means operated by swinging movement of the forked member for moving the valves to and from said valve seats.

19. A pulsator for milking machines or the like according to claim 18 including a substantially vertical oil passage through the upper portion of said forked member leading to said interengaging means and receiving oil from said first mentioned vertical oil passage.

CHARLES E. SUNDERLAND.